United States Patent
Foster et al.

(10) Patent No.: US 6,801,773 B2
(45) Date of Patent: *Oct. 5, 2004

(54) APPARATUS, METHOD AND SYSTEM FOR MOBILE WIRELESS COMMUNICATION HAND-OFF UTILIZING SHARED DIRECTORY NUMBERS AND MULTIWAY CAPABILITIES

(75) Inventors: Eugene William Foster, Naperville, IL (US); Kimberly Sue Tomasko-Dean, LaGrange, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 254 days.

This patent is subject to a terminal disclaimer.

(21) Appl. No.: 09/895,427

(22) Filed: Jun. 28, 2001

(65) Prior Publication Data

US 2003/0003915 A1 Jan. 2, 2003

(51) Int. Cl.[7] .................................................. H04Q 7/20
(52) U.S. Cl. ..................... 455/436; 455/432.1; 455/442
(58) Field of Search .............................. 455/442, 432.1, 455/436

(56) References Cited

U.S. PATENT DOCUMENTS

| | | | |
|---|---|---|---|
| 4,829,554 A | * | 5/1989 | Barnes et al. ............ 455/432.1 |
| 5,590,172 A | | 12/1996 | Lodwig et al. |
| 5,909,487 A | | 6/1999 | Mainker |
| 5,940,758 A | | 8/1999 | Chavez, Jr. et al. |
| 6,009,326 A | * | 12/1999 | Roder et al. ................. 455/436 |
| 6,263,203 B1 | | 7/2001 | Jahn |
| 6,501,952 B1 | | 12/2002 | Foster et al. |
| 2001/0012335 A1 | | 8/2001 | Kaufman et al. |
| 2003/0003911 A1 | * | 1/2003 | Foster et al. ................. 455/436 |
| 2003/0003915 A1 | * | 1/2003 | Foster et al. ................. 455/442 |
| 2003/0003916 A1 | | 1/2003 | Foster et al. |

* cited by examiner

*Primary Examiner*—William Cumming (57) ABSTRACT

An apparatus, method and system are provided for hand-off of a communication session in a mobile wireless communication system, from the serving base station to a target base station, utilizing a shared directory number associated with a first terminal of the serving base station which is providing the communication session with the mobile unit through a first call path. The serving base station includes a second terminal having the shared directory number associated with the first terminal. A switch, coupled to the serving base station and to the target base station, is configured, upon reception of a message from the serving base station, to establish a second call path from the second terminal of the serving base station to the target base station, and to bridge the second call path with the communication session of the first call path to form a multiway communication session, with the multiway communication session including a bridged call path to the target base station. Upon the communication of the mobile unit with the target base station for continuation of the communication session through the bridged call path, the serving base station is released from the multiway communication session.

36 Claims, 5 Drawing Sheets

APPARATUS, METHOD AND SYSTEM FOR MOBILE WIRELESS COMMUNICATION HAND-OFF UTILIZING SHARED DIRECTORY NUMBERS AND MULTIWAY CAPABILITIES

FIELD OF THE INVENTION

The present invention relates, in general, to wireless communication systems, and more particularly, to an apparatus, method and system for mobile wireless communication hand-off utilizing shared directory numbers and ISDN multiway capabilities.

BACKGROUND OF THE INVENTION

Mobile wireless communication systems typically employ many base stations (such as cell sites) to provide wireless communication throughout a given geographic region. As a mobile unit may traverse the geographic region, the communication to and from the mobile unit may occur through one or more of these base stations. To maintain an ongoing communication session during such transitions between base stations, various hand-off methods have evolved to transfer the wireless communication to the mobile unit from one base station to another base station, while maintaining such an ongoing call or session.

In the prior art, for some of the various methods utilized during such hand-offs, the communication session may suffer from some degree of interruption, which may be noticeable to the consumer of wireless communication services. As a consequence, a need remains to provide for comparatively seamless hand-offs, which do not interrupt ongoing communication sessions and which are imperceptible to the consumer.

In addition, while other prior art systems may provide comparatively seamless hand-offs, such hand-offs typically utilize considerable network resources. In an Autoplex® system, for example, in addition to switches and base stations, another network entity referred to as an Executive Call Processor ("ECP") selects a server at the new cell site, while another network entity referred to as a Call Processing Database Node ("CDN") transmits various data link messages to the current and new cell sites, adding an additional path to the existing call, directing the new cell site to activate a wireless voice link, and directing the current (serving) cell site to direct the mobile to retune to the new wireless voice link at the new cell site.

As a consequence, a need remains for a wireless communication system to provide comparatively seamless and imperceptible hand-offs. In addition, such a wireless communication system should be reasonably efficient and capable of cost-effective implementation, eliminating or minimizing the use of additional network resources.

SUMMARY OF THE INVENTION

The wireless communication system of the present invention provides virtually seamless and imperceptible hand-offs of communication sessions of mobile units. The various embodiments of the present invention are reasonably efficient and capable of cost-effective implementation in existing communication equipment such as switches and base stations. Moreover, the various embodiments of the present invention eliminate or minimize the use of additional network resources such as ECPs and CDNs, while being compatible with other intelligent network devices and systems.

In accordance with the present invention, an apparatus, method and system are provided for hand-off of a communication session utilizing shared directory numbers and multiway capabilities, in which the communication session of a mobile unit is transferred from a serving base station to a target base station. The preferred system includes a switch coupled to a serving base station and a target base station, preferably over digital lines having multiple, independent channels, such as Integrated Services Digital Network ("ISDN") lines. Typically, each of the various base stations include a plurality of terminals which handle and process the communication sessions with mobile units and, in general, one or more terminals are assigned directory numbers ("DNs"). In accordance with the present invention, such DNs are shared by terminals in the serving base station.

In accordance with the present invention, the serving base station contains a plurality of terminals, of which two or more share a directory number. In general, the communication session to be handed off is occurring on a first call path of a first terminal that has a shared directory number. When a hand-off of the communication is indicated, a second terminal of the serving base station having the same shared directory number (of the first terminal providing the communication session), initiates a second call path to the target base station. This second call path (of the second terminal of the serving base station) is then bridged into the active communication session of the first call path (of the first terminal of the serving base station) to form a multiway communication session among the mobile unit, the two terminals of the serving base station, and via the switch, the target base station. This multiway communication session includes a bridged call path to the target base station. The mobile unit then communicates with the target base station for continuation of the communication session through the bridged call path. The first and second terminals of the serving base station are then released from the call, with the communication session continuing, uninterrupted, over the bridged call path and between the target base station and the mobile unit.

As a consequence, the communication session of the mobile unit has been handed off, seamlessly and without interruption, from the serving base station to the target base station. Such a hand-off has also occurred utilizing minimal network resources, the switch and the base stations, without involvement of other intelligent or supervisory network elements.

The multiway communication session from the serving base station to the switch is established through the transmission of various messages between the serving base station and the switch. The switch is correspondingly configured to establish and connect the second call path to the communication session of the first call path, to form the multiway communication session, upon receipt of these various messages. In one of the embodiments, the serving base station includes instructions to transmit a call set up message to the switch, and to transmit various other messages with reference to the shared directory number and the various first and second call paths.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for a wireless communication system to provide comparatively seamless and imperceptible hand-offs, which is reasonably efficient and capable of cost-effective implementation, and which eliminates or minimizes the use of additional network resources such as ECPs and CDNs. In accordance with the present invention, a system, apparatus and method are illustrated which provide such advantages, namely, providing relatively seamless and imperceptible wireless hand-offs while utilizing minimal network resources (namely, utilizing existing switches and base stations configured in accordance with the invention), while simultaneously eliminating the prior art utilization of other network elements such as ECPs and CDNs.

Figure 1:
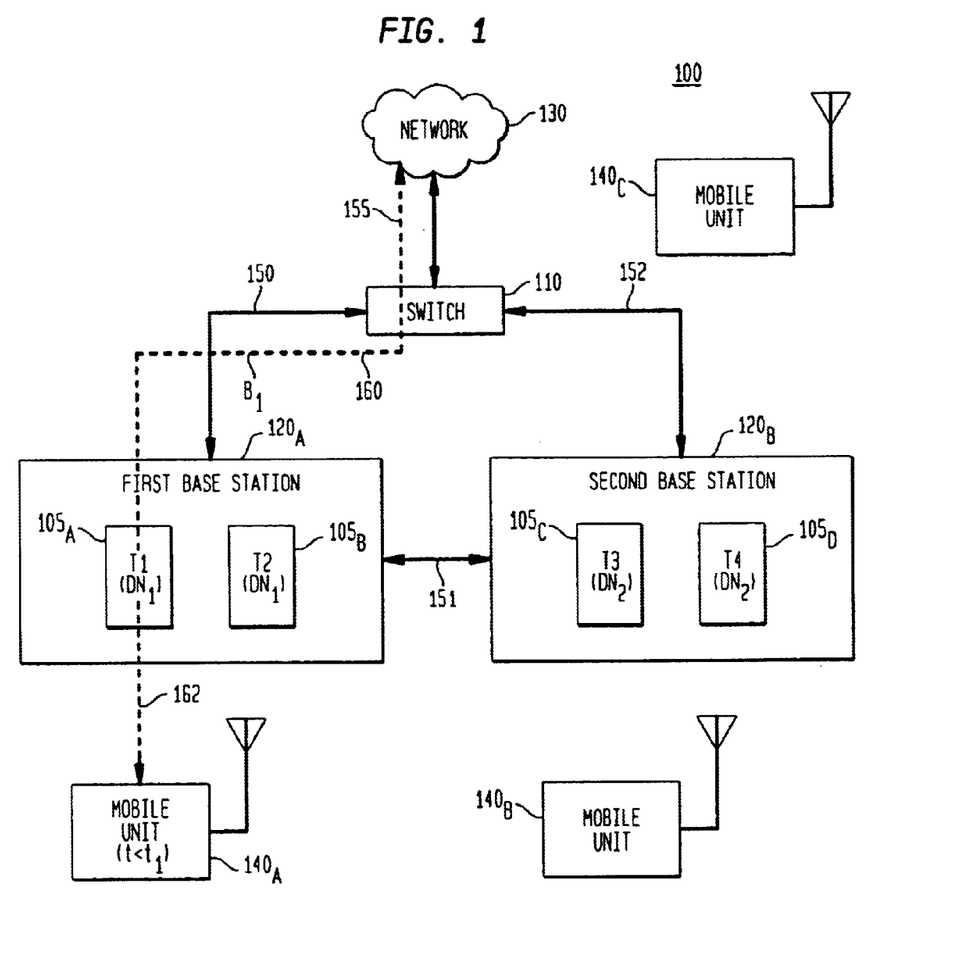
FIG. 1 is a block diagram illustrating a system embodiment, with a first communication path illustrated from a first base station to a mobile unit prior to a hand-off, in accordance with the present invention.

FIG. 1 is a block diagram illustrating such a system embodiment 100 in accordance with the present invention. As illustrated in FIG. 1, the system 100 includes a switch 110 and one or more base stations (equivalently, cell sites) 120, such as first base station $120_A$ and second base station $120_B$. It should be noted that the associated transceivers or antenna arrays (not separately illustrated) of the base stations (or cell sites) 120 may be at one or more different locations or otherwise geographically distributed. Within each base station are one of more terminals 105 (illustrated as T1, T2, T3 and T4), which handle calls to and from the various mobile units (equivalently, mobile stations) 140, illustrated as mobile units $140_A$, $140_B$, and $140_C$. In general, each terminal is assigned a directory number ("DN"), such as $DN_1$, or $DN_2$. In accordance with the present invention, two or more terminals 105 within the same base station 120 are assigned and share one or more of the same directory numbers. As illustrated in FIG. 1, terminals $105_A$ and $105_B$ of the serving base station $120_A$ are both assigned and share the same DN, $DN_1$, while terminals $105_C$ and $105_D$ of the target base station $120_B$ are both assigned and share the same DN, $DN_2$.

The switch 110 is preferably a telecommunication switch such as a 5 ESS® switch or a 7RE switch manufactured by Lucent Technologies, Inc., which has been configured to operate in accordance with the present invention, as discussed in greater detail below. The switch 110 is coupled to a network 130, for additional call routing. The switch 110 may also be included within a mobile switching center, and may also be coupled to other intelligent network devices (not illustrated). The base stations 120 include wireless transceivers for wireless communication with the various mobile units 140, such as cellular or other wireless telephones, wireless modems, or other wireless or mobile communication devices or stations. The switch 110 and base stations 120 are coupled to each other utilizing signaling and/or trunking lines 150, 151 and 152, as known in the art, and in the preferred embodiment, lines 150, 152 (and potentially 151) are ISDN lines, and may also be implemented with a Basic Rate Interface ("BRI"), and may be either custom or national ISDN implementations. In the preferred embodiment, each of the terminals 105 within a base station 120 may access any channel within the ISDN lines, such as a first (B) channel $B_1$, a second (B) channel $B_2$, an $n^{th}$ (B) channel $B_N$, and one or more signaling or messaging channels (D).

As any mobile unit 140 traverses a geographic region and becomes farther away from any given base station 120 with which it has been in communication, the signal or power levels of such wireless communication to and from the mobile unit 140 typically drop below a preferred threshold or range. Under these circumstances, it is preferable for the given base station 120 to hand-off the communication to another base station 120 having higher signal strength to and from the given mobile unit 140. Continuing to refer to FIG. 1, for example, the mobile unit $140_A$ (at a time $t<t_1$) is currently served by a first terminal $105_A$ of first base station $120_A$, illustrated as communication or call paths or legs 162 (wireless) and 160 (wireline), forming a first call path, with the wireline portion (call leg 160) using a first channel $B_1$ of ISDN line 150. (The portion of the communication session between the switch 10 and the network 130 is separately illustrated as call path or leg 155). In these circumstances, the first base station $120_A$ is generally referred to as a serving base station or serving cell site. As the mobile unit $140_A$ travels toward the vicinity of second base station $120_B$, it may become necessary or preferable for the first, serving base station $120_A$ to hand-off the communication session of mobile unit $140_A$ to the second base station $120_B$. In these circumstances, the second base station $120_B$ is generally referred to as a target base station or target cell site. Such a hand-off, in accordance with the present invention, is illustrated below with respect to FIG. 2.

Figure 2:
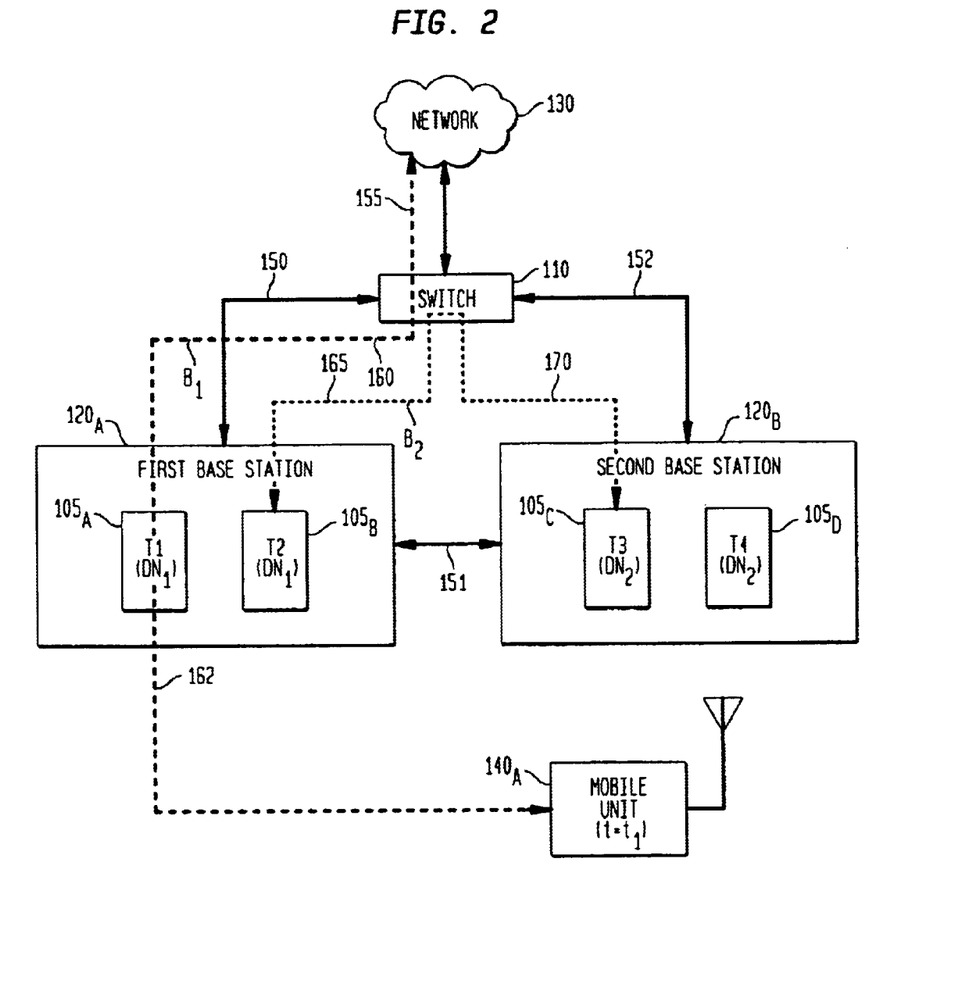
FIG. 2 is a block diagram illustrating a system embodiment, with the first communication path illustrated from the first base station to the mobile unit and a second communication path illustrated during a hand-off, in accordance with the present invention.

FIG. 2 is a block diagram illustrating a system 100 embodiment, with the first communication path (legs 160 and 162) illustrated from the switch 110 and first base station $120_A$ to the mobile unit $140_A$ and a second communication path (legs 165 and 170) illustrated during a hand-off, in accordance with the present invention. In the system 100 embodiment illustrated in FIGS. 1–3, the terminal $105_B$ of the serving base station $120_A$ shares the same directory number of terminal $105_A$; terminal $105_A$ (the "active" terminal) is handling the communication session of the mobile unit $140_A$, to be handed off to target base station $120_B$. To accomplish a hand-off in accordance with the present invention, and as explained in greater detail below, a terminal within the serving base station $120_A$ which is sharing the same DN (or other call appearance) of the active terminal $105_A$, in this case terminal $105_B$, initiates a second call path to target base station $120_B$, utilizing a second ISDN channel $B_2$, through call paths or legs 165 and 170. The terminal $105_B$ of the serving base station $120_A$ then sends instructions to the switch 110 to place this second call, between terminal $105_B$ and the target base station $120_B$, on "hold". If the terminals $105_A$ and $105_B$ (T1 and T2) are not automatically bridged by virtue of having the same DN or call appearance, the first and second calls are bridged at the terminals $105_A$ and $105_B$ (T1 and T2). The terminal $105_B$ then requests that the switch 110 establish a multiway (or conference) connection between the first and second independent calls to and from, respectively, terminals $105_A$ and $105_B$, specifying the directory number shared by the two terminals (as a call reference). The switch then bridges the first and second independent calls, namely, call paths or legs 160, 165 and 170, thereby establishing a multiway communication session between the serving base station $120_A$ and the target base station $120_B$, via the switch 110. Additional and more specific message flows and other details are discussed below with reference to FIG. 5.

Additional variations are also within the scope of the present invention. For example, terminal $105_B$ could use a different, non-shared directory number in establishing its communication (the second call path on legs 165 and 170) with the target base station $120_B$. In addition, terminal $105_B$ could use another idle call appearance of the shared DN or another idle call appearance of a different DN. Following establishment of the second, independent call path (on legs 165 and 170) through any of these various means, the various requests and messages for creating a multiway connection then achieve the same result, i.e., a conference or multiway connection linking the two call paths of the two terminals of the serving base station with a terminal at the target base station.

As discussed in greater detail below, this is accomplished through call set up and retrieve messages, the assignment of shared directory numbers to the terminals 105 of the base stations 120, and configuring the switch 110 to recognize particular messages as a request to combine an existing communication session on a first call path with another, second call path, preferably with a specific, shared DN. The hand-off then proceeds as illustrated below with reference to FIG. 3.

Figure 3:
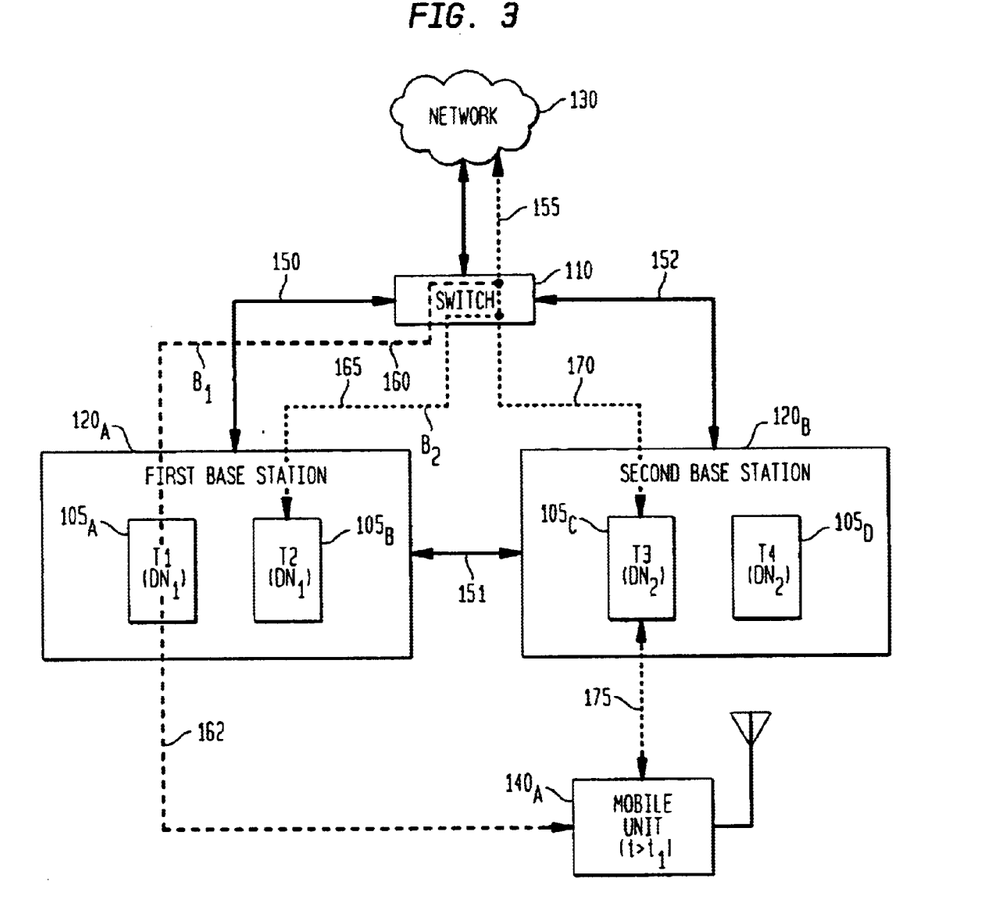
FIG. 3 is a block diagram illustrating a system embodiment, with the second communication path illustrated during completion of a hand-off and the commencement of a tear down of the first communication path, in accordance with the present invention.

FIG. 3 is a block diagram illustrating a system embodiment during completion of a hand-off of a communication session from the serving base station $120_A$ to the target base station $a20_B$. When the second call path (call legs 165 and 170) has been bridged into the first call path (leg 160) at the switch 110, forming a multiway or conference (three-way), in accordance with the present invention, the mobile unit $140_A$ is then instructed by the serving base station $120_A$ or otherwise determines to communicate with (tune to) a specified channel of, or otherwise set up a communication path to, the target base station $120_B$, illustrated as call path or leg 175, for continuation of the communication session through a portion of the second call path, namely, call legs 175, 170 and 155. Terminals $105_A$ and $105_B$ disconnect and are released from the call, tearing down call path legs 160, 162 and 165. The hand-off of the communication session from the serving base station $120_A$ to the target base station $120_B$ is complete, with the communication session along call paths or legs 155, 170 and 175 continuing uninterrupted, as illustrated in FIG. 3.

As may be apparent from the above discussion, the hand-off of the communication session, from the serving base station $120_A$ to the target base station $120_B$ using the shared directory number with multiway capability occurs seamlessly and without interruption. In addition, such a hand-off is accomplished without the need for additional network resources.

Figure 4:
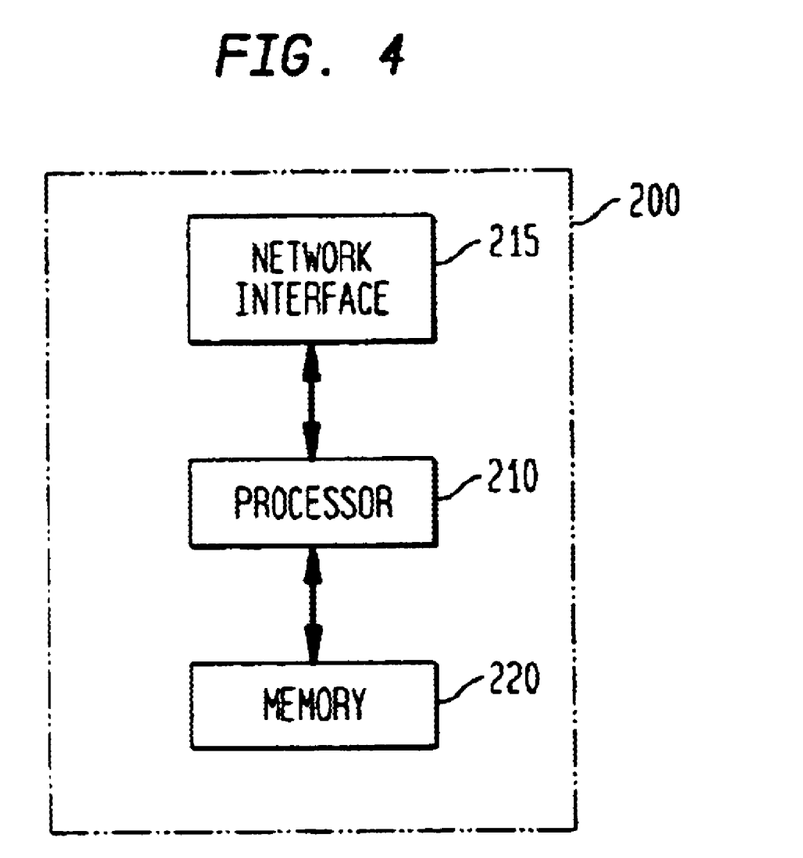
FIG. 4 is a block diagram illustrating an apparatus embodiment in accordance with the present invention.

FIG. 4 is a block diagram illustrating an apparatus embodiment 200 in accordance with the present invention.

As discussed in greater detail below, such an apparatus 200 may be included within, or distributed between, a switch 110 and/or a base station 120 of a system 100. (Numerous other variations and equivalent embodiments will be readily apparent and are also within the scope of the present invention.). The apparatus 200 includes a processor 210, a network interface 215, and a memory 220. The network interface 215 is utilized for transmission and reception of the various communication links (legs or paths), and also for transmission and reception of the various messages, requests, responses and other signaling discussed above and also discussed below with reference to FIG. 5, such as various ISDN Q.931 messages, with either National or Custom ISDN implementations. The memory 220 may be a magnetic hard drive, an optical storage device, RAM, FLASH, a memory circuit, or any other type of memory, data storage apparatus or circuit. The memory 220 is used to store information pertaining to call placement, call set up, routing information, shared directory numbers, and configuration or program instructions, as discussed in greater detail below.

Continuing to refer to FIG. 4, the processor 210 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIGS. 1–3, and also discussed in detail below with reference to FIG. 5, with associated memory, such as microprocessor memory or additional RAM, DRAM, SRAM, MRAM, ROM, EPROM or $E^2$PROM. The processor 210 with its associated memory may be configured (via programming, configuration or hardwiring) to perform the methodology of the invention, as discussed above with reference to FIGS. 1–3 and as discussed below with reference to FIG. 5. For example, the methodology may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). Equivalently, when the processor 210 with its associated memory and other equivalent components are implemented in whole or part as FPGAs, custom ICs and/or ASICs, the FPGAs, custom ICs or ASICs also may be designed, configured and/or hardwired to implement the methodology of the invention. In the preferred embodiment, the processor 210 is implemented in its entirety as a microprocessor, which is programmed to implement the methodology of the invention. As mentioned above, such an apparatus 200 may be included within, or distributed between, a switch 110 and/or a base station 120.

Figure 5:
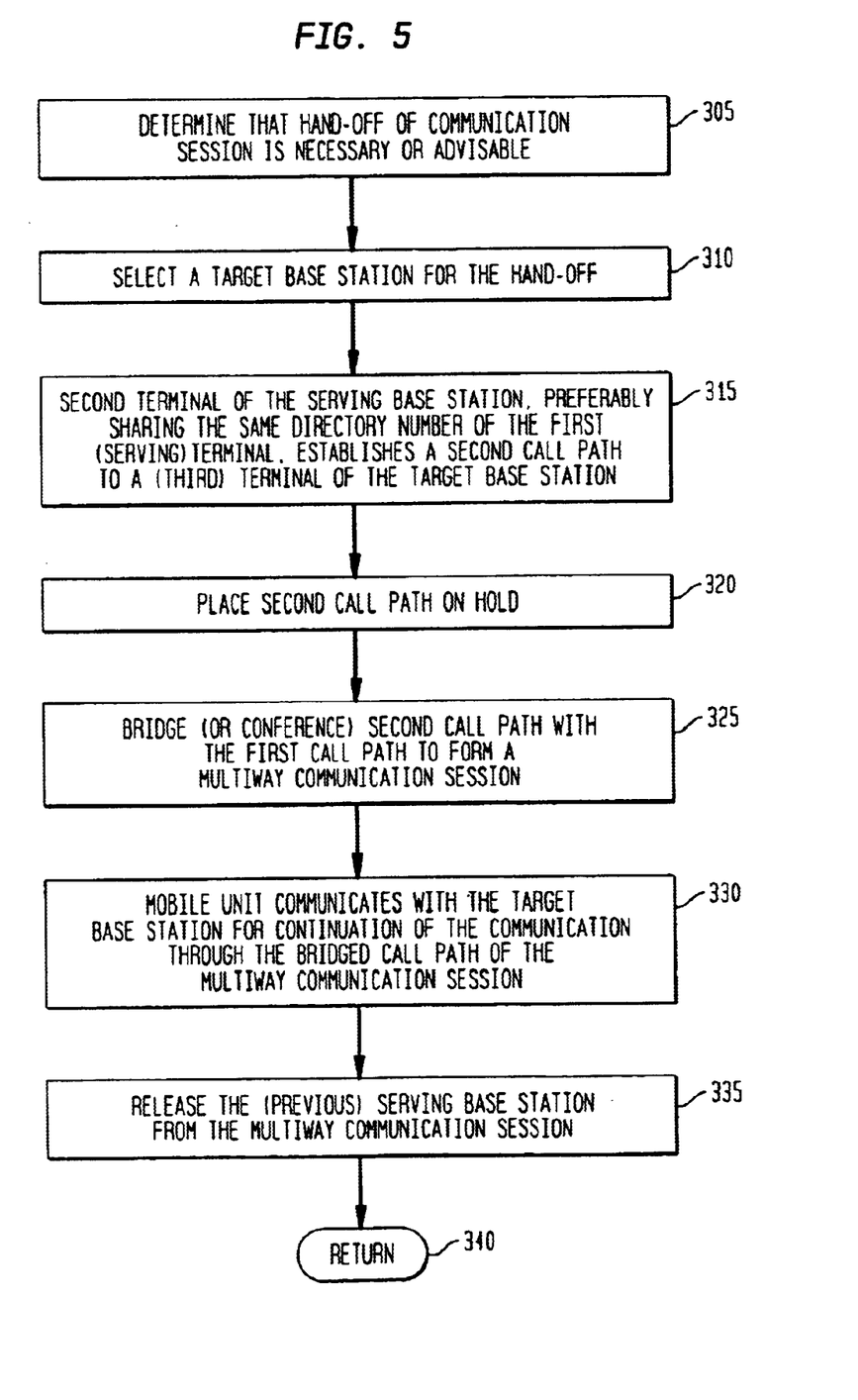
FIG. 5 is a flow diagram illustrating a method embodiment in accordance with the present invention.

FIG. 5 is a flow diagram illustrating a method embodiment in accordance with the present invention. Beginning with start step 300, the method determines that a hand-off is necessary or preferable, step 305. This may be accomplished through various methods known in the art, from various requests transmitted by the serving base stations, such as base station $120_A$, with responses from the potential target base stations, such as base station $120_B$, or by determinations made by the particular mobile unit 140. Next, a target base station is selected for a hand-off, also as known in the art, such as base station 120$_B$, step 310.

A second terminal of the serving base station 120$_A$, preferably sharing the same directory number of the first terminal 105$_A$ currently serving the first call path to the mobile station 140$_A$, such as terminal 105$_B$ of the serving base station 120$_A$, then establishes a second call path (illustrated as call path legs 165 and 170 in are FIG. 2) to a (third) terminal (such as terminal 105$_C$) at the target base station 120$_B$ via the switch 110, step 315. In the preferred embodiment, step 315 commences the hand-off by transmission of a "SETUP" message by terminal 105$_B$ of the serving base station 120$_A$ to the switch 110 for a new, second call, receives a corresponding acknowledgement from the switch 110, and then transmits an information (INFO) message to the switch 110, with a designation of the shared DN (or another, different DN) in the keypad field. The switch 110, in turn, transmits call setup messages to (a terminal of) the target base station 120$_B$, with various messages for alerting, connection, connection acknowledgements, and so on, between the switch 110 and the serving or target base stations. The call is preferably established on a second channel (B$_2$) available to the serving base station 120$_A$ on line 150.

Following establishment of this second call path, this second call path is placed on hold, step 320, with this second terminal (105$_B$) sending a request, preferably a hold message, to the switch 110 (to place its communication on call path legs 165 and 170 on hold). Next, in step 325, the second call path (call legs 165 and 170) are bridged into the communication session of the first call path (call leg 160), forming a multiway communication session. As mentioned above, this bridging generally occurs through the transmission of various messages between the terminal 105$_B$ of the serving base station and the switch 110, discussed below.

In the preferred embodiment, following establishment of the second call path (step 315) and placing this second, independent call on hold (step 320), bridging step 325 begins with terminal 105$_B$ of the serving base station 120$_A$ transmitting a first "RETRIEVE" message to the switch 110, having a call reference to the first call path (CR=1). After acknowledging the RETRIEVE message, for a National ISDN implementation, the switch 110 may also transmit a "NOTIFY" message to terminal 105$_A$ of the serving base station 120$_A$. Terminal 105$_B$ then transmits an information (INFO) message to the switch 110, designating a conference or other multiway feature in a feature activation field, and having a call reference to the first call path (CR=1), and receives a corresponding acknowledgement from the switch 110. The terminal 105$_B$ of the serving base station 120$_A$ transmits another (second) "RETRIEVE" message to the switch 110, having a call reference to the second call path (CR=2), which takes the second call path off hold and selects it as the added leg to the conference, receives a corresponding acknowledgement from the switch 110, and then terminal 105$_B$ of the serving base station 120$_A$ transmits a third "RETRIEVE" message to the switch 110, having a call reference to the first call path (CR=1), which merges or combines the first and second call paths to form the multiway (conference) communication session between the two terminals at the serving base station, and via the switch, and the target base station. (The second call reference may also be released at this point in the process). Essentially, the second terminal 105$_B$ retrieves the held call (second call path) and bridges it into the active communication session (in the first call path), forming the multiway communication session between the serving and target base stations, via the switch.

It should be noted that while the messaging scheme illustrated in FIG. 5 pertains to National ISDN implementations, equivalent messaging is available in Custom ISDN implementations, and are also within the scope of the present invention. For example, the "retrieve" messages discussed above may be replaced with equivalent "reconnect" and other custom ISDN messages, achieving the same result of the present invention in the same way.

Following the creation of the multiway communication session, the mobile unit 140$_A$ establishes communication with the target base station (call leg 175), step 330, for continuation of the communication session through the bridged call path, illustrated as call path or leg 170 in FIGS. 2 and 3 (in addition to call paths 155 and 175), of the multiway communication session. The previously serving base station 120$_A$ may now disconnect and be released from the multiway communication session, tearing down call paths or legs 160, 165 (and 162), step 335. Step 335 may be accomplished through serving base station terminals 105$_A$ and 105$_B$ transmitting a "DISCONNECT" messages to the switch 110, followed by a "KEY RELEASE" message from the switch 110 to terminal 105$_B$, and other RELEASE messages and RELEASE COMPLETE messages between the switch 110 and the terminals 105$_A$ and 105$_B$. Following step 335, the method may end, return step 340, with the communication session continuing uninterrupted along call path legs 155, 170, and 175, as illustrated in FIG. 3.

In the preferred embodiment, a variety of methods may be utilized to provide for the establishment of call path 175. For example, the mobile unit 140$_A$ may be directed by the serving base station 120$_A$ to tune to a channel of the target base station 120$_B$; or the mobile unit 140$_A$ may initiate such tuning to the target base station. To complete the hand-off, the target base station 120$_B$ then notifies the serving base station 120$_A$ that it may now drop (tear down) its portion of the three-way call (call path legs 160, 162, and 165). This notification is usually accomplished through independent signaling paths, illustrated generally as signaling and/or trunking line 151 in FIGS. 1–3.

Numerous advantages of the present invention may be apparent from the above discussion. First, as illustrated above, the wireless communication system of the present invention provides virtually seamless and imperceptible hand-offs of communication sessions of mobile units. Second, the various embodiments of the present invention are reasonably efficient and capable of cost-effective implementation in existing communication equipment such as switches and base stations. Moreover, the various embodiments of the present invention eliminate or minimize the use of additional network resources such as ECPs and CDNs, while being compatible with other intelligent network devices and systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for hand-off of a communication session in a mobile wireless communication system, utilizing a shared directory number associated with a first terminal of a serving base station providing the communication session with the mobile unit through a first call path, in which the communication session is transferred from the serving base station to a target base station, the method comprising:

(a) establishing a second call path from a second terminal of the serving base station to the target base station, the second terminal having the shared directory number associated with the first terminal;

(b) bridging the second call path with the communication session of the first call path to form a multiway communication session, the multiway communication session including a bridged call path to the target base station; and (c) when the mobile unit has established communication with the target base station for continuation of the communication session through the bridged call path, releasing the serving base station from the three-way communication session.

2. The method of claim 1, wherein step (a) further comprises:

transmitting a plurality of messages, the plurality of messages including a call setup message having a call reference to the second terminal and an information message designating the shared directory number in a keypad field.

3. The method of claim 1, wherein step (b) further comprises:

placing the second call path on hold.

4. The method of claim 1, wherein, a hold message is transmitted by the serving base station, the hold message having a call reference to the second call path.

5. The method of claim 4, further comprising:

transmitting an information message, the information message having a call reference to the first call path and having a conference designation in a feature activation field.

6. The method of claim 5, farther comprising:

transmitting a first retrieve message or a first reconnect message, the first retrieve message and the first reconnect message having a call reference to the second call path.

7. The method of claim 6, further comprising:

transmitting a second retrieve message or a second reconnect message, the second retrieve message and the second reconnect message having a call reference to the first call path.

8. The method of claim 1, wherein step (c) further comprises:

transmitting a disconnect message from the second terminal of the serving base station to the switch; and transmitting a key release message from the switch to the second terminal of the serving base station.

9. The method of claim 1, wherein step (c) further comprises:

transmitting a disconnect message from the first terminal of the serving base station to the switch; and transmitting a release message from the switch to the first terminal of the serving base station.

10. A system for hand-off of a communication session in a mobile wireless communication system, utilizing a shared directory number associated with a first terminal of a serving base station providing the communication session with the mobile unit through a first call path, in which the communication session is transferred from the serving base station to a target base station, the system comprising:

a plurality of base stations, the plurality of base stations including the serving base station and the target base station, the serving base station including a second terminal having the shared directory number associated with the first terminal; and a switch coupled to the serving base station and to the target base station, wherein the switch is configured, upon reception of a message from the serving base station, to establish a second call path from the second terminal of the serving base station to the target base station, and to bridge the second call path with the communication session of the first call path to form a multiway communication session, the multiway communication session including a bridged call path to the target base station; and when the mobile unit has established communication with the target base station for continuation of the communication session through the bridged call path, the switch is further configured to release the serving base station from the multiway communication session.

11. The system of claim 10, wherein the second terminal of the serving base station is configured to transmit a plurality of messages, the plurality of messages including a call setup message having a call reference to the second terminal and an information message designating the shared directory number in a keypad field.

12. The system of claim 10, wherein the switch is further configured to place the second call path on hold.

13. The system of claim 10, wherein the second terminal of the serving base station is configured to transmit a hold message to the switch, the hold message having a call reference to the second call path.

14. The system of claim 13, wherein the second terminal of the serving base station is configured to transmit an information message to the switch, the information message having a call reference to the first call path and having a conference designation in a feature activation field.

15. The system of claim 14, wherein the second terminal of the serving base station is configured to transmit a first retrieve message or a first reconnect message to the switch, the first retrieve message and the first reconnect message having a call reference to the second call path.

16. The system of claim 15, wherein the second terminal of the serving base station is configured to transmit a second retrieve message or a second reconnect message to the switch, the second retrieve message and the second reconnect message having a call reference to the first call path.

17. The system of claim 10, wherein the second terminal of the serving base station is configured to transmit a disconnect message to the switch; and wherein the switch is configured to transmit a key release message to the second terminal of the serving base station.

18. The system of claim 10, wherein the first terminal of the serving base station is configured to transmit a disconnect message to the switch; and wherein the switch is configured to transmit a release message to the first terminal of the serving base station.

19. An apparatus for hand-off of a communication session in a mobile wireless communication system, utilizing a shared directory number associated with a first terminal of a serving base station providing the communication session with the mobile unit through a first call path, in which the communication session is transferred from the serving base station to a target base station, the apparatus comprising:

a network interface for communication with a switch and with the mobile unit;

a memory storing instructions, said instructions including hand-off instructions; and a processor coupled to the memory and to the network interface, wherein the processor is configured to transmit a first message to the switch for establishing a second call path through the network interface to the target base station, the first message designating the shared directory number; to transmit a second message to the switch for bridging the second call path with the communication session of the first call path to form a multiway communication session, the multiway communication session including a bridged call path to the target base station; and when the mobile unit has established communication with the target base station for continuation of the communication session through the bridged call path, the processor is further configured to transmit a third message to the switch for releasing the network interface from the three-way communication session.

20. The apparatus of claim 19, wherein the first message is a plurality of messages, the plurality of messages including a call setup message having a call reference to the second terminal and an information message designating the shared directory number in a keypad field.

21. The apparatus of claim 19, wherein the processor is further configured, following establishment of the second call path, to transmit a hold message to the switch, the hold message having a call reference to the second call path.

22. The apparatus of claim 21, wherein the processor is further configured, following placement of the second call path on hold, to transmit an information message to the switch, the information message having a call reference to the first call path and having a conference designation in a feature activation field.

23. The apparatus of claim 22, wherein the processor is further configured to transmit a first retrieve message or a first reconnect message, the first retrieve message and the first reconnect message having a call reference to the second call path.

24. The apparatus of claim 23, wherein the processor is further configured to transmit a second retrieve message or a second reconnect message, the second retrieve message and the second reconnect message having a call reference to the first call path.

25. The apparatus of claim 19, wherein the processor is farther configured, when the mobile unit has established communication with the target base station for continuation of the communication session through the bridged call path to transmit a disconnect message to the switch.

26. The apparatus of claim 19, wherein the apparatus is embodied within a serving base station.

27. An apparatus for hand-off of a communication session in a mobile wireless communication system, utilizing a shared directory number associated with a first terminal of a serving base station providing the communication session with the mobile unit through a first call path, in which the communication session is transferred from the serving base station to a target base station, the apparatus comprising:
  a network interface for communication with the serving base station and the target base station;
  a memory storing instructions, said instructions including hand-off instructions; and
  a processor coupled to the memory and to the network interface, wherein the processor is configured, upon reception of a plurality of messages from a second terminal of the serving base station, the second terminal having the shared directory number associated with the first terminal, to establish a second call path from the second terminal of the serving base station to the target base station, and to bridge the second call path with the communication session of the first call path to form a multiway communication session, the multiway communication session including a bridged call path to the target base station; and following a communication of the mobile unit with the target base station for continuation of the communication session through the bridged call path, the processor is further configured to release the serving base station from the multiway communication session.

28. The apparatus of claim 27, wherein the plurality of messages include a call setup message having a call reference to the second terminal and an information message designating the shared directory number in a keypad field.

29. The apparatus of claim 27, wherein the processor is further configured to place the second call path on hold.

30. The apparatus of claim 27, wherein the plurality of messages include a hold message, the hold message having a call reference to the second call path.

31. The apparatus of claim 27, wherein the plurality of messages include an information message, the information message having a call reference to the first call path and having a conference designation in a feature activation field.

32. The apparatus of claim 31, wherein the plurality of messages further include a first retrieve message or a first reconnect message, the first retrieve message and the first reconnect message having a call reference to the second call path.

33. The apparatus of claim 32, wherein the plurality of messages further include a second retrieve message or a second reconnect message, the second retrieve message and the second reconnect message having a call reference to the first call path.

34. The apparatus of claim 27, wherein the processor is further configured, upon reception of corresponding disconnect messages, to transmit through the network interface, a key release message to the second terminal of the serving base station and a release message to the first terminal of the serving base station.

35. The apparatus of claim 27, wherein the apparatus is embodied within a switch.

36. An apparatus for hand-off of a communication session in a mobile wireless communication system, utilizing a shared directory number associated with a first terminal of a serving base station providing the communication session with the mobile unit through a first call path, in which the communication session is transferred from the serving base station to a target base station, the apparatus comprising:
  a network interface for communication with a switch and with the mobile unit;
  a memory storing instructions, said instructions including hand-off instructions; and
  a processor coupled to the memory and to the network interface, wherein, for establishing a second call path through the network interface to the target base station, the processor is configured to transmit to the switch a call setup message having a call reference to the second terminal and an information message designating the shared directory number in a keypad field; and for bridging the second call path with the communication session of the first call path to form a multiway communication session, the multiway communication session including a bridged call path to the target base station, the processor is configured to transmit a hold message to the switch, the hold message having a call reference to the second call path, to transmit an information message to the switch, the information message having a call reference to the first call path and having a conference designation in a feature activation field, to transmit a first retrieve message or a first reconnect message, the first retrieve message and the first reconnect message having a call reference to the second call path, and to transmit a second retrieve message or a second reconnect message, the second retrieve message and the second reconnect message having a call reference to the first call path; and when the mobile unit has established communication with the target base station for continuation of the communication session through the bridged call path, the processor is further configured to transmit a disconnect message to the switch for releasing the network interface from the multiway communication session.

* * * * *